United States Patent

Elliott

[19]

[11] Patent Number: 5,871,219
[45] Date of Patent: Feb. 16, 1999

[54] TABLE DOLLY

[75] Inventor: Kenneth Marvin Elliott, Lithia Springs, Ga.

[73] Assignee: Purposeful Products, Inc., Atlanta, Ga.

[21] Appl. No.: 719,789

[22] Filed: Sep. 25, 1996

[51] Int. Cl.[6] .................................................. B62M 1/00
[52] U.S. Cl. ................ 280/79.3; 280/47.34; 280/47.35; 280/79.7
[58] Field of Search .............................. 280/79.7, 79.11, 280/79.3, 47.34, 47.35

[56] References Cited

U.S. PATENT DOCUMENTS

| 1,330,891 | 2/1920 | Merrill | 280/79.7 |
|---|---|---|---|
| 1,359,032 | 11/1920 | Cole | 280/79.3 |
| 2,687,310 | 8/1954 | Goetz . | |
| 2,945,699 | 7/1960 | Berlye . | |
| 3,445,150 | 5/1969 | Zartarian | 280/47.35 |
| 3,705,731 | 12/1972 | Berchak | 280/79.11 |
| 4,360,211 | 11/1982 | Blake . | |
| 5,037,117 | 8/1991 | Hershberger . | |

FOREIGN PATENT DOCUMENTS

| 1323664 | 3/1963 | France | 280/79.3 |

OTHER PUBLICATIONS

Brochure entitled "Midwest Building Products—Folding Tables Chairs and Table Caddies", date unknown, Author: Midwest Folding Products, Chicago, Illinois, (see especially cover page and p. 11).

Brochure entitled "Furniture for Hotels, Clubs & Restaurants", copyright 1996, Virco Mfg. Corporation, (see p. 43).

Brochure from Consolidated Furniture Company, Inc. date unknown, p. 25.

Primary Examiner—J. J. Swann
Assistant Examiner—Jim McClellan
Attorney, Agent, or Firm—Jones & Askew

[57] ABSTRACT

A table dolly apparatus and method for using same which allows folded tables to be vertically stacked tin two adjacent side-by-side columns, such that the planar folded tables are inclined slightly from horizontal to reduce the dolly's transverse width such that it can pass through doorways.

16 Claims, 2 Drawing Sheets

TABLE DOLLY

TECHNICAL FIELD

The present invention relates to the transportation of folding tables, and particularly relates to the provision and use of a table dolly for supporting, transporting, and storing a plurality of folded folding tables in a safe, reliable and efficient manner.

BACKGROUND OF THE INVENTION

It is well known to provide folding tables which include a main planar body and typically two sets of folding leg assemblies foldably attached relative to the underside of the main planar body. When in use, the folding leg assemblies are extended to provide support for the planar bodies. However, when the folding tables are not needed, the folding leg assemblies can be folded into their more compact "retracted" positions, such that the folding tables can be stored away in a remote location. When so folded, the tables are typically substantially planar, and if so desired can be stacked on the floor, for example, in vertical stacks (with the bodies being substantially horizontal), or stacked side-by-side leaning against a wall, with the bodies being inclined slightly off vertical.

In the hospitality industry, such as the hotel industry, it is not uncommon for a particular business or organization to own and use a large number of such folding tables. It is also not uncommon for a multitude of tables to be required in a large room such as a conference room and ballroom during the day, yet these same tables must be removed to a remote location (such as a storage closet or room) to make room for dancing or other social activities in the evening. Such a conversion often must take place within just a few hours, and in such an instance time and manpower is of the essence.

It may be therefore understood that there is a need to provide an effective method and means for so transporting the folded tables, especially in an environment where "set up" and "take down" of a large number of tables is required on possibly a daily basis. There is also a need to so transport such tables with a high degree of manpower efficiency and safety. If an apparatus is to be used to accomplish such a task, there is a need to provide such and apparatus which is easily loaded and unloaded, has a relatively high capacity, and can be readily maneuvered by a single operator around the set up area and also through relatively narrow doorways while fully loaded. Finally, worker safety is always a high priority, so any such apparatuses should be safe to operate in that the tables stacked thereon should not tend to fall off.

The prior art has attempted to accomplish the above-referenced objectives, although it is submitted that the prior art has shortcomings. For example, U.S. Pat. No. 2,687,310, to Goetz, entitled "Mobile Sheet Pack", issued Feb. 5, 1953, discloses a mobile sheet rack which is configured to accept a plurality of sheets such as stainless steel in a pair of stacks without marring or buckling the sheets. U.S. Pat. No. 2,687,310, to Blake, entitled "Dolly Apparatus", issued Sep. 2, 1980, likewise discloses an apparatus for maintaining sheet material in a stable configuration, but in a single stack.

U.S. Pat. No. 2,945,699, to Beyrle, entitled "furniture truck", issued Jul. 19, 1960, discloses an apparatus, which accepts a number of folding chairs, either on their ends or on their sides. On column 2, beginning at line 55, the Beyrle reference discloses that when the chairs are loaded on their sides instead of their ends, the innermost chair on each end of the truck rests "against the small supporting frame formed by the members 23 and 25".

U.S. Pat. No. 2,687,310, to Hershburger, entitled "Folding Table Caddie", discloses the concept of loading folding leg tables atop a "caddie", which folds flat for storage. Locking bars are used to keep the first table in place. A good example of the stacking method is shown in FIG. 4.

Although the prior art may include advantages, it also includes deficiencies. For example, the prior art described above does not appear to provide a stable yet easily mobile apparatus for stacking two side-by-side substantially vertical columns of stacked folding tables each at an orientation slightly inclined from horizontal with their long edges substantially vertically aligned and in position for easy loading and unloading.

SUMMARY OF THE INVENTION

The present invention overcomes deficiencies in the prior art by providing an improved table dolly which can be easily loaded and unloaded, has a relatively high capacity, and can be readily maneuvered by a single operator around a set up area and also through relatively narrow doorways while fully loaded.

Generally described, the present invention provides an apparatus for supporting and transporting two adjacent substantially vertical columns of stacked folded tables, the apparatus comprising a frame, a central spine defining two opposing substantially vertical table edge support surfaces, and first and second inclined folded table lower support means for supporting the lowermost table in each of corresponding first and second stacks of folded tables, the first and second folded table lower support means being configured such that the first and second stacks of folded tables can be stacked in substantially vertical columns on opposing sides of the central spine, with the inside edges of tables in each of the two stacks being in contact with and provided with at least partial side support by a corresponding one of the two vertical table edge support surfaces of the central spine.

The present invention also provides an apparatus for supporting and transporting two adjacent columns of stacked folded tables, the apparatus comprising a frame, a central spine defining two opposing substantially vertical table edge support surfaces, and first and second inclined folded table support means each defining corresponding first and second inclined support surfaces for supporting the lowermost table in each of corresponding first and second stacks of folded tables, the first and second folded table lower support means being configured such that the first and second stacks of folded tables can be stacked on opposing sides of the central spine with the inside edges of tables in each stack being in contact with and provided with at least partial side support by the central spine.

Finally, the present invention also provides a method of stacking folded tables atop an apparatus and moving the tables to a remote location, said method including the steps of first stacking two side-by-side columns of folded tables against a central spine of the apparatus, said spine defining two opposing substantially vertical surfaces each configured for contacting a plurality of folded table edges within a particular stack, such that the tables have substantially coaligned longitudinal axes; and then moving the apparatus through a doorway during which the longitudinal axes of the tables are substantially aligned with the travel path of the traveling apparatus.

Therefore, it is an object of the present invention to provide an improved folded table dolly.

It is a further object of the present invention to provide an improved table dolly for supporting and storing folded tables which is easy to load and unload.

It is a further object of the present invention to provide an improved table dolly which is easily maneuvered.

It is a further object of the present invention to provide an improved table dolly which can fit through a relatively narrow doorway while fully loaded.

It is a further object of the present invention to provide an improved table dolly which is safe to operate in that there is a returned danger of table "spillage" during movement of the dolly.

It is a further object of the present invention to provide an improved table dolly which can be loaded by a single user.

It is a further object of the present invention to provide an improved table dolly which can be operated by a single user.

It is a further object of the present invention to provide an improved table dolly which has a high capacity, and can be used to transport as well as to provide long-term storage of folded tables.

It is a further object of the present invention to provide an improved table dolly which is easy to manufacture and maintain.

It is a further object of the present invention to provide an improved table dolly which reduces downtime.

It is a further object of the present invention to provide an improved table dolly which improves staff efficiency.

Other objects, features, and advantages of the present invention will become apparent upon reading the following detailed description of the preferred embodiment of the invention when taken in conjunction with the drawings and the appended claims.

DETAILED DESCRIPTION OF THE PREFERRED EMBODIMENT

General Composition and Operation

Figure 1:
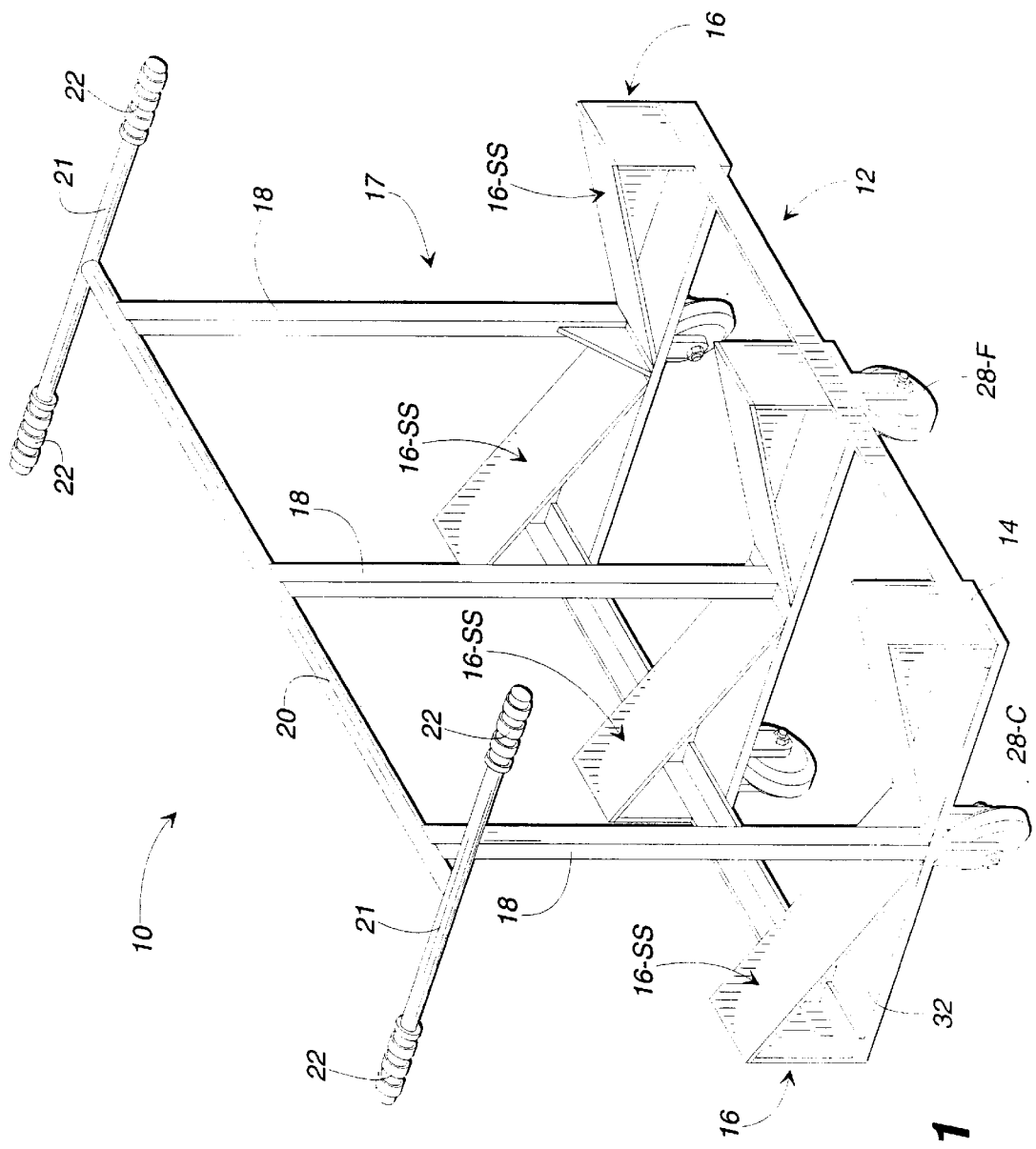
FIG. 1 is a pictorial view of an unloaded apparatus according to the present invention.
Figure 2:
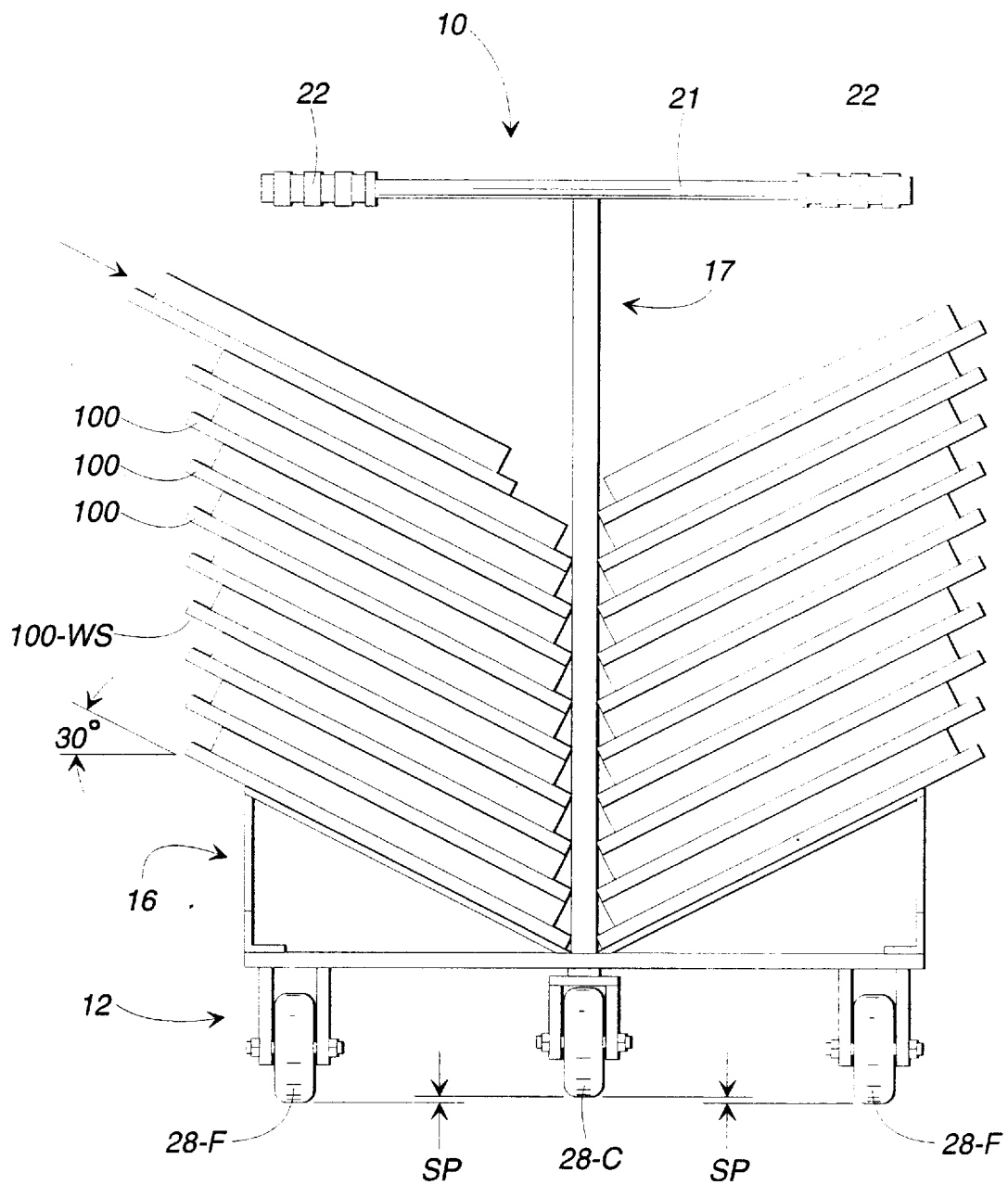
FIG. 2 is an end view of an apparatus according to the present invention which is loaded with folded tables.

The composition and operation of the present invention is now provided, in general reference to FIGS. 1 and 2.

FIG. 1 shows the apparatus 10 according to the present invention, in its empty state. FIG. 2 shows the apparatus according to the present invention in a substantially fully loaded state, in that it is substantially fully loaded with inwardly-inclined folded tables 100, the tables being loaded into two side-by-side substantially vertical columns.

The columns, although in vertical columnar stacks, are composed of folded tables 100 in an inclined configuration. The arrow in FIG. 2 illustrates the general direction that the topmost table in the left column (as viewed by the reader) is moved into its finally loaded position. When the folded tables 100 are in place, the loaded apparatus 10 can then be transported by the aid of attached roller wheels 28-C, 28-F to a remote location, wherein the tables can then be unloaded and erected. During the transport stage, the inclined orientation of the loaded tables 100 allows for the loaded apparatus 10 to be rolled through relatively narrow door passageways.

Details Regarding Construction

Referring now to FIG. 1, the apparatus 10 according to the present invention includes a base 12, inclined folded table support members 16, a central edge-aligning spine member 17, handlebar grips 22, and roller wheels 28. As shown in FIG. 2, folded tables 100 can be stacked atop the inclined support members 16, whereupon a user (not shown) can then push or pull on the grips 22 of the handlebars 21 to transport the loaded apparatus 10 to a remote location.

The Base

The base 12 of the apparatus 10 is substantially rigid, and is composed of a plurality of structural members suitable to support the weight of the folded table stacks. In the preferred embodiment, angle irons were used along the outer long edges of the frame.

The Spine

The spine 17 extends generally upwardly from the base 12 of the apparatus 10, and includes three generally vertical post members 18 and a single horizontal beam member 20. Each of the three generally vertical post members 18 is attached at its lower end to the base 12 of the apparatus 10, and supports at its upper end the single horizontal beam member 20. Each of the three generally vertical post members 18 provides two opposing substantially vertical surfaces for contact with the longitudinal edges of stacked tables.

As noted above, it may be understood that each of the generally vertical post members 18 of the spine 17 provides two opposing vertical surfaces against which to stack the inside edges of the folded tables. It may also be understood that other surfaces could also be provided, such as by a flat-wall-shaped spine defining two opposing planar surfaces, three round rails, or even rails having outwardly-directed edges which contact the table edges, although such rail edges could disadvantageously damage the edges of the stacked tables. The function desired is edge alignment and support for the table edges.

The Inclined Support Members

The inclined support members 16 are six in number in the preferred embodiment, although other numbers of inclined support members 16 are contemplated without departing from the spirit and scope of the present invention. Each of the inclined support members 16 defines a corresponding inclined, generally upwardly directed support surface 16-SS (see FIG. 1), which is configured to contact and support a folded table laid thereon, typically such that the working surface 100-WS (the surface which typically provides support for food, drinks, etc.) of the lowermost table 100 is in downward planar contact with three of the support surfaces 16-SS of the inclined support members 16, as shown in FIG. 2.

The Handle

The table dolly apparatus 10 includes a pair of handlebars 21, which are attached to opposite ends of the apparatus 10. Each of these two handlebars 21 includes a pair of hand grips 22 which facilitate hand gripping of the handlebar 21 by a user (not shown). This allows the user (not shown) to lead or follow an apparatus 10 through a doorway while pulling or pushing the apparatus, respectively.

The Wheels

The apparatus 10 includes a plurality of rolling wheels 28 which allow for the apparatus 10 to be rolled along a floor, including a carpeted floor. Although other configurations are contemplated, the preferred embodiment disclosed in the figures includes the use of four wheels, two of which are fixed axle axis intermediate wheels 28-F, and two of which are caster-type leading and trailing wheels 28-C.

The two fixed axle axis wheels 28-F are rotatably mounted relative to the base 12 of the table dolly apparatus 10 such that the rotational axes of the wheels are substantially transverse to the path of the dolly when being moved from one site to another. However, the relative locations of the fixed-longitudinal axis of the fixed axle axis wheels 28-F allow for ready manipulation of the dolly in "tight quarters", in that the table dolly may effectively be turned in a zero-turning radius manner, effectively allowing it to be completely turned around within a circle having a diameter equal to the lengths of the loaded tables.

The two caster-type wheels 28-C are mounted relative to the frame of the table dolly such that their lowermost tread surfaces are slightly higher (by a space SP) than those of the two fixed axle axis wheels 28-F. This allows for a rocking motion to be imparted on the table dolly, which allows a user to utilize the two fixed axle axis wheels 28-F as the main supporting wheels (allowing for a zero turning radius as noted above), and to utilize the two caster-type wheels 28-C to provide balance.

The "zero-turn-radius" feature described above is an important feature of the present invention, in that this allows an operator to mainpulate the dolly effectively during the loading or unloading feature.

Details Regarding Operation

To load the apparatus, folded tables 100 or other planar objects are stacked atop the apparatus as shown in FIG. 2. Typically this is done by grasping one long edge of a folded table, hoisting the table to a suitable height, and allowing the other long edge to lead the table into place, such the free long edge is pushed against one opposing vertical surface 18-VS of the central spine 18. Typically the "upper" supporting surface of the tables (the surface which is upwardly facing when the table is being used) is downwardly facing when the table is folded and loaded on the table dolly apparatus 10. Unloading is accomplished by substantially reversing the loading process.

The cooperation between the spine and the inclined support members 16 is an important part of the present invention. As may be seen in FIG. 2, a relatively high number of folding table can be stacked atop each other, while still tending to remain relatively stable due to the stabilizing nature of the central spine, upon which the tables tend to lean. As may be understood, this is an advantage in that stacks of tables can, if not stacked in a stable manner, pose a significant saftey risk.

Dimensions, Construction

The supporting surfaces of the inclined supporting members in the preferred embodiment are at approximately thirty degrees (30°) from horizontal, although other angles are contemplated under the spirit and scope of the present invention. Although other dimensions are contemplated under the spirit and scope of the present invention, the overall lengths of the handles is approximately 6'2", and the overall length and width of the apparatus is 5'0" and 2'5", respectively. Angle irons of 1½"×1½" dimensions may be used along the long edges of the frame, and the inclined support members can have faces of dimensions 1'4"×6" wide, with intermediate gaps being approximately 1'9" apart. The vertical spine post members 18 can be 2"×1" steel tubing.

The apparatus shown in the figures includes continuous welds for strength, capacity, and longer life.

In the preferred embodiment shown in the figures, the table dolly 10 according to the present invention can carry two side-by-side stacks of approximately 10 classroom tables per stack nomially over 18 inches wide through a less than 3'0" (three foot) door opening. As may be seen, if the stacks were not inclined, instead laying flat, they would not fit through such a narrow passageway when in a side-to-side relationship.

Alternatives

The present invention contemplates the use of alternate configurations. For example, the handlebars 21 could be eliminated, with the horizontal bar member 20, or a suitable modification thereof, being usable as a gripping means.

Alternatives are also contemplated for the inclined support members. For example, instead of three support members per side, a single member could be used, or any plurality of members could be used. Alternately, inclined rails could also be used instead of the flat plates in the preferred embodiment. Carpet or other suitable padding could be used atop the inclined support members.

Advantages

It may be understood that the combination of the angled lower supporting surfaces and the central spine provides a dolly construction which allows for the loading of two adjacent stacks or "columns" of stacked folded tables in an angled orientation. This provides the dolly 10 with a relatively high capacity, while at the same time keeping the overall width of the loaded dolly less than if the tables were simply stacked horizontally.

It may also be understood that the table dolly according to the present invention, although providing the many advantages noted above, it still quite simple in construction, with no moving parts (other than the wheels) to require maintenance. None of the parts require removal during typical operation of the dolly apparatus 10, which eliminates the chances of part loss, misplacement, or incorrect installation.

Conclusion

The present invention therefore provides an improvement over the prior art by providing an improved folding table dolly apparatus which is easily loaded and unloaded, has a relatively high capacity, and can be maneuvered by a single operator through relatively narrow passageways while fully loaded.

I claim:

1. An apparatus for supporting and transporting first and second adjacent substantially vertical columns of stacked folded tables, each column including a plurality of folded tables; said apparatus comprising:

a frame;

a central spine having a height and defining two opposing, substantially vertical, substantially coparallel, table edge support surfaces extending continuously along the majority of said height of said central spine; and first and second inclined folded table lower support means for supporting a lowermost table in each of corresponding first and second columns of folded tables, said first and second folded table lower support means and said central spine being configured such that said first and second columns of folded tables can be stacked in substantially vertical columns on opposing sides of said central spine to a height at least half that of said central spine, with the inside edges of said plurality of tables in each of said two columns of tables being in contact with and provided with at least partial side support by a corresponding one of said two vertical table edge support surfaces of said central spine.

2. The apparatus as claimed in claim 1, wherein said first and second inclined folded table support means correspond to and are configured to support said first and second columns of folded tables such that they are inclined towards each other and towards said central spine while said columns remain substantially vertical.

3. The apparatus as claimed in claim 2, wherein said first and second inclined folded table support means are configured to support said first and second vertical columns of folded tables such that they are inclined towards each other at an angle from horizontal approximating 30 degrees.

4. The apparatus as claimed in claim 1, wherein said central spine includes a vertical post.

5. The apparatus as claimed in claim 4, wherein said frame has a length and a width, said width being shorter that said width, and said central spine extends substantially along said frame length.

6. The apparatus as claimed in claim 1, further comprising at least one caster member attached to the bottom of said frame to allow said frame to be rolled.

7. The apparatus as claimed in claim 1, such that said tables are inclined within said vertical columns to a degree such that they can pass through a doorway which they otherwise would not if they were not inclined.

8. The apparatus as claimed in claim 1, such that said central spine runs along the length of said apparatus and is longer then said frame is wide.

9. An apparatus for supporting and transporting first and second adjacent columns of stacked folded tables, each column including at least two folded tables; said apparatus comprising:

a frame;

a central spine having a height and defining two opposing, substantially vertical, substantially parallel, table edge support surfaces extending continuously along the majority of said height of said central spine; and first and second inclined folded table support means each defining corresponding first and second inclined support surfaces for supporting a lowermost table in each of corresponding first and second columns of folded tables, said first and second folded table lower support means and said central spine being configured such that said first and second columns of folded tables can be stacked on opposing sides of said central spine to a height at least half that of said central spine, with the inside edges of said plurality of tables in each column being in contact with and provided with at least partial side support by said central spine.

10. The apparatus as claimed in claim 9, wherein said first and second inclined folded table support means correspond to and are configured to support said first and second columns of folded tables such that they are inclined towards each other and towards said central spine.

11. The apparatus as claimed in claim 9, wherein said first and second inclined folded table support means correspond to and are configured to support said first and second columns of folded tables such that they are inclined towards each other at an angle from horizontal approximating 30 degrees.

12. The apparatus as claimed in claim 9, wherein said central spine includes at least one vertical post.

13. The apparatus as claimed in claim 12, wherein said central spine includes three vertical posts.

14. The apparatus as claimed in claim 9, further comprising at least one caster member attached to the bottom of said frame to allow said frame to be rolled.

15. The apparatus as claimed in claim 9, such that said tables are inclined within said columns to a degree such that they can pass through a doorway which they otherwise would not if they were not inclined.

16. The apparatus as claimed in claim 9, such that said central spine runs along the length of said apparatus.

* * * * *